INVENTOR.
FRANK J. LUKETA
BY
Reynolds, Beach + Christensen
ATTORNEYS

Nov. 27, 1962 F. J. LUKETA 3,065,562
TRAWLER
Filed Dec. 2, 1959 7 Sheets-Sheet 3

INVENTOR.
FRANK J. LUKETA
BY
Reynolds, Beach
& Christensen
ATTORNEYS

Nov. 27, 1962
F. J. LUKETA
3,065,562
TRAWLER
Filed Dec. 2, 1959
7 Sheets-Sheet 4
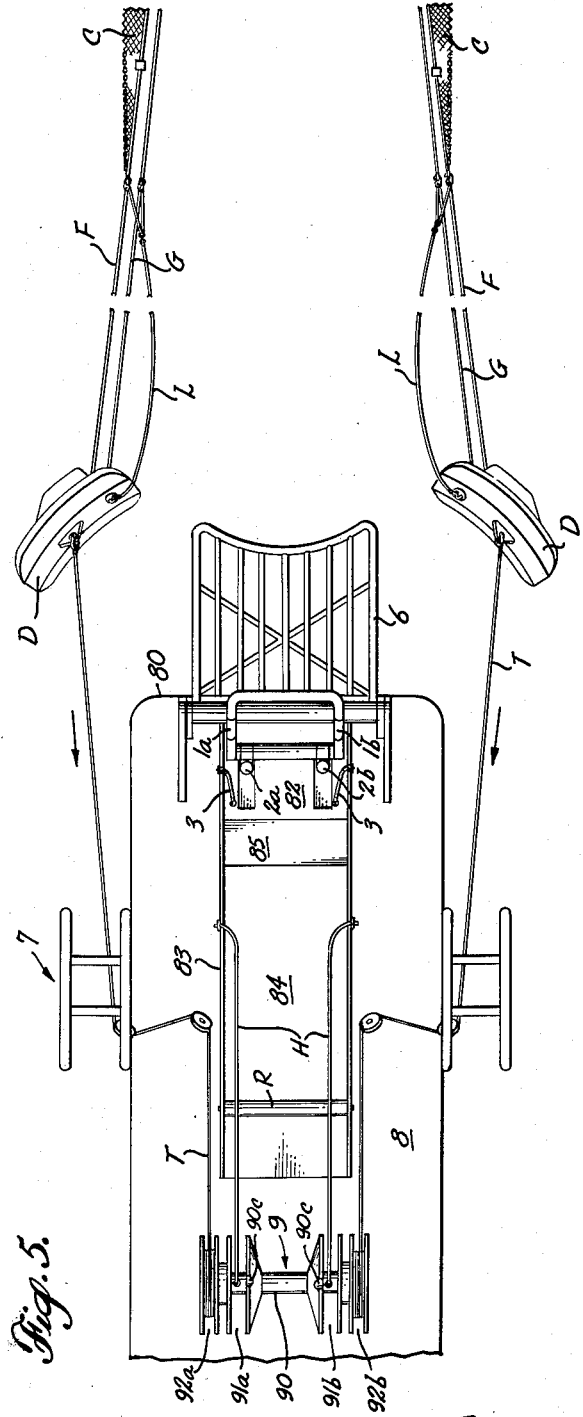
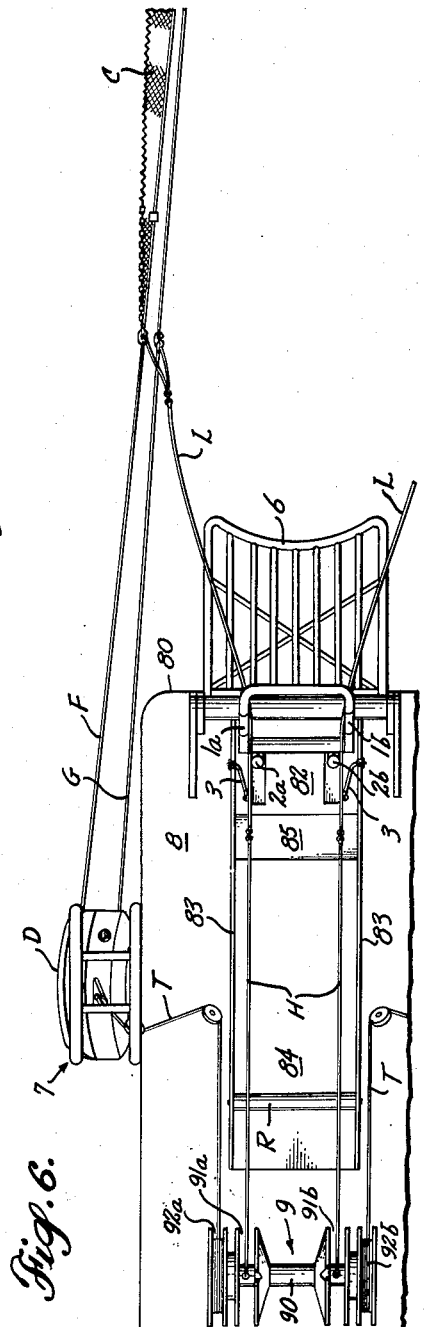
INVENTOR.
FRANK J. LUKETA
BY
Reynolds, Beach & Christensen
ATTORNEYS

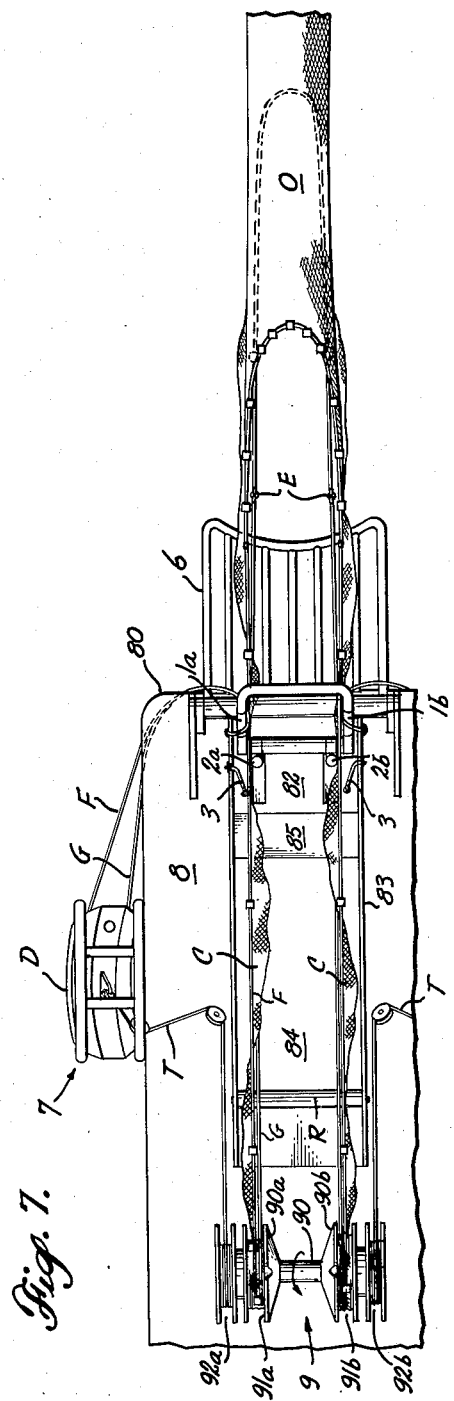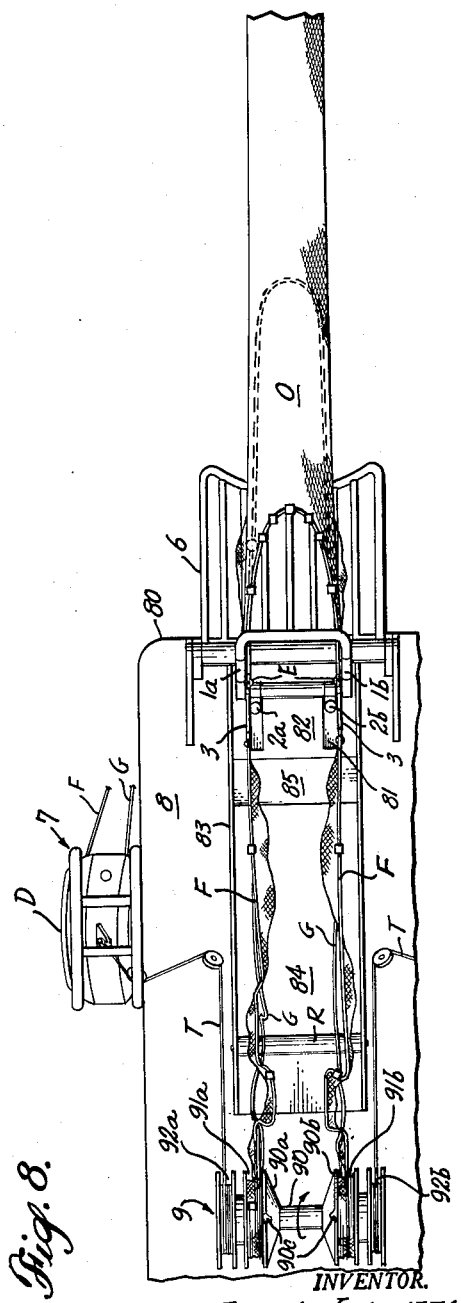

Nov. 27, 1962 F. J. LUKETA 3,065,562
TRAWLER
Filed Dec. 2, 1959 7 Sheets-Sheet 6
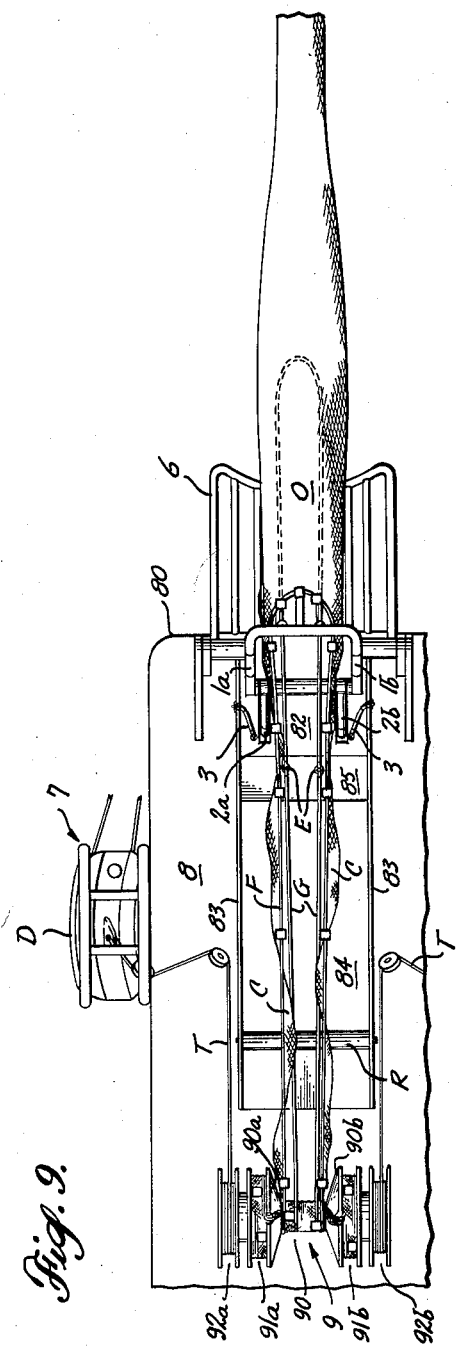
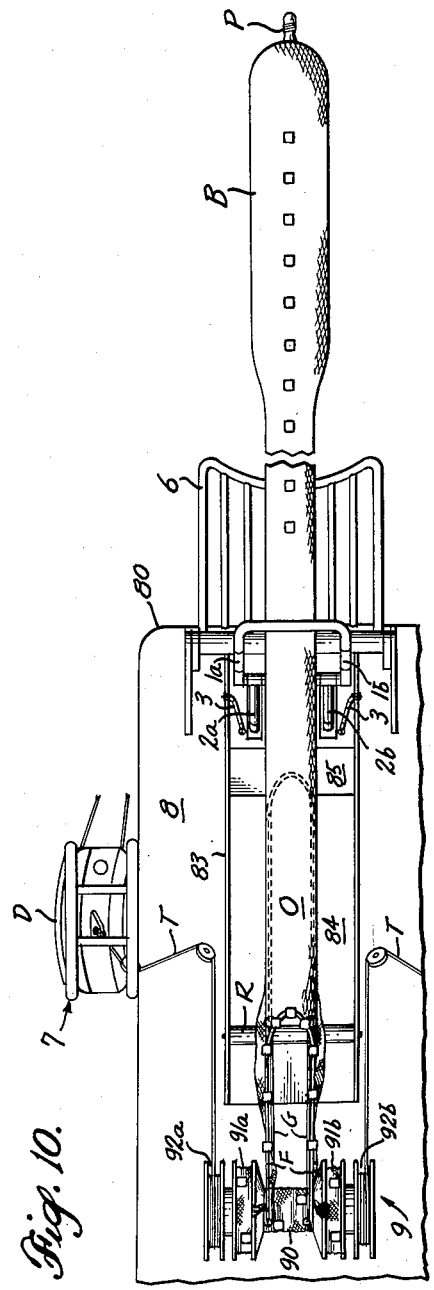
INVENTOR.
FRANK J. LUKETA
BY
Reynolds, Beach & Christensen
ATTORNEYS

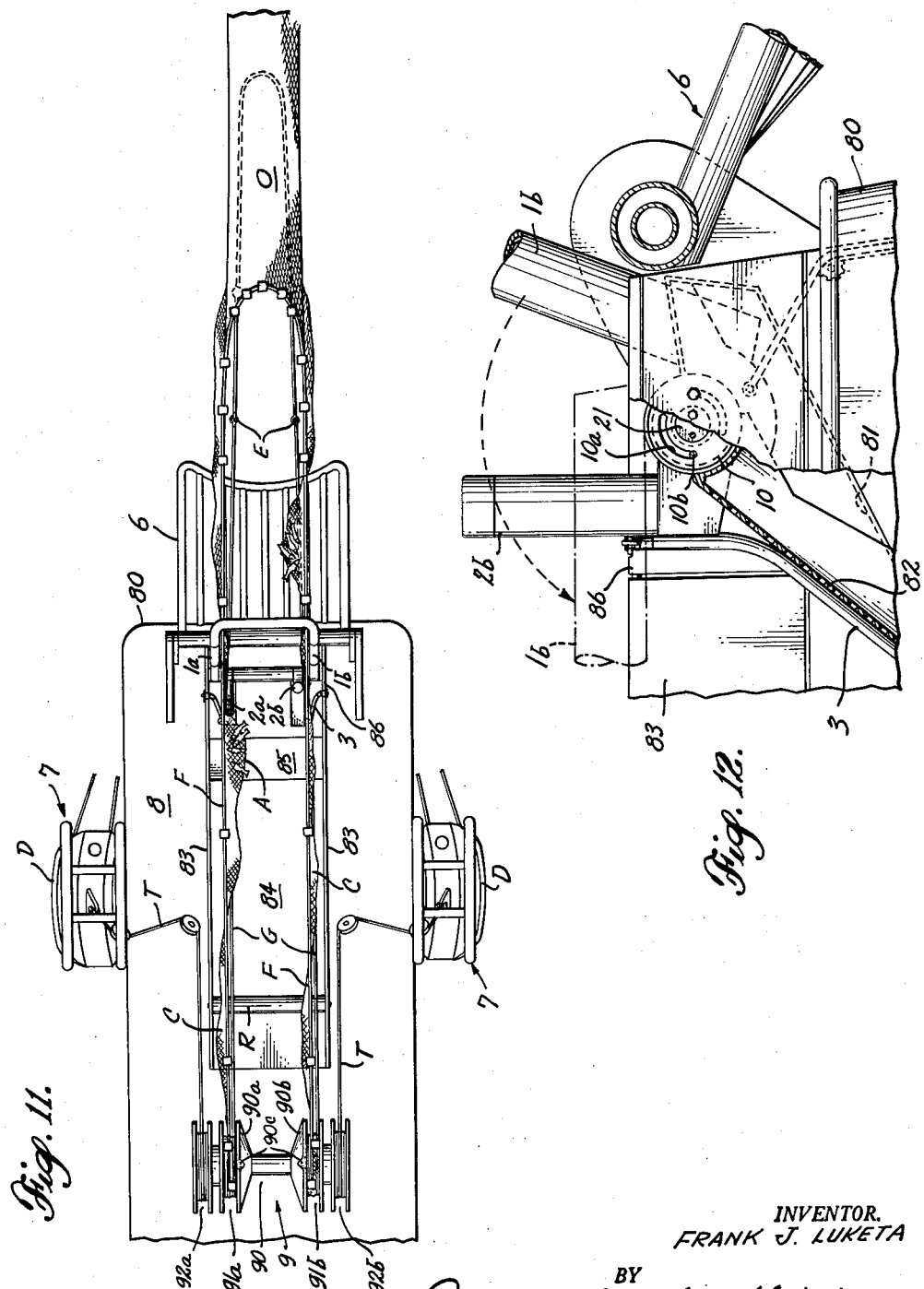

United States Patent Office 3,065,562
Patented Nov. 27, 1962

3,065,562
TRAWLER
Frank J. Luketa, 5567 Greenwood, Seattle, Wash.
Filed Dec. 2, 1959, Ser. No. 856,806
13 Claims. (Cl. 43—8)

The invention with which this application is directly concerned deals with gear installed at the stern of a trawling vessel (usually termed a trawler) for handling and guiding the trawl net and the lines leading thereto onto winch drums on the deck of the vessel when hauling the net, and with a method for hauling the net aboard the trawler. The trawler as illustrated includes various other gear and structure, such for example as door-securing stanchions, a trough for receiving and enabling ready segregation of the haul, cleanout arrangements, distributing mechanism, and the like, each of which will be the subject of further applications for patent, but which will be referred to hereinafter. The winch illustrated is the subject of an application copending herewith, Serial No. 836,636, filed August 28, 1959, and U.S. Patent No. 2,954,209 issued September 27, 1960. A stern ramp, also illustrated, is the subject of my application Serial No. 20,582, filed April 7, 1960.

Trawlers in use in various areas differ in their procedure, and are often differently built, and their equipment is differently installed, because of such procedural differences, and of differences in the kind and amount of the catch which is expected. There are trawlers which operate with towing warps over a single side rail, and trailing thence aft, or there may be two trawl nets, one over each side rail. In the Pacific Northwest, however, the normal trawling rig includes towing warps which extend over the respective sides and aft to the outspread wings of a single net, and in hauling, the net is drawn to the stern, rather than hauled over the side, as in the side trawling rig previously mentioned, and until recent years the hauling has been completed by a series of successive strapping operations, using straps about and choking the net and hoisted by a fall line from a boom block overhead, and so hauled in step by step onto the trawler's afterdeck. The gear used in this procedure has been known as the dandy line gear, and is represented in the British patent to Dahl, No. 232,914, dated November 26, 1924, or in U.S. patent to Vigneron, No. 1,601,893, dated October 5, 1926.

Recently this type of gear has been superseded in the Pacific Northwest by gear arranged for drum trawling, whereby the entire net is reeled in, with its floats, weights, tickler chain, chafing gear and all oher appurtenances in place, following hauling lines and connected lazy lines, onto the same drum, to conclude the hauling operation. A special winch drum is used for the purpose, connected, during hauling only, to the forward portions of the net, usually to forwardly extending divergent wings or curtains, by hauling lines connected to lazy lines which are slack during trawling, after the forward ends of the curtains have been brought to the stern of the trawler. Various improvements have been described and claimed in my copending applications referred to in detail heretofore and hereinafter, and more especially the drum trawling and hauling method has been disclosed and claimed in my application Serial No. 570,771, filed March 12, 1956, now superseded by continuation application Serial No. 132,234 filed August 17, 1961. The present application pertains to an extension of that method and to gear which is particularly desirable for use with that method and with the gear described in conjunction with the same, more particularly with the two sets of lines and the several winch drums that are employed in that method. Nevertheless, while the invention is particularly designed for use in conjunction with the drum trawling method just outlined, its principles can be applied also to other trawling gear and methods, and the claims, unless the contrary clearly appears, are to be read as applicable to such other gear and methods.

One of the objects of the present invention is to reduce to a minimum the arduous labor heretofore associated with trawling, and to make possible the handling of the lines, net and other gear to the maximum extent by power means, by employing guides which insure proper guidance of the lines and net from the water over the stern and onto the drum, all to the end that the hauling operation can be performed within a minimum of time and with minimum likelihood of damage to the net or other gear, and wih sufficiently flexibility to accommodate situations which depart from the normal.

It is especially an object of this invention to provide means associated with the guides, already mentioned, that will avoid interference of the net or other gear with the guides, and will move the guides automatically, or permit their manual movement, out of the way if such interference becomes or is likely to become severe, yet will enable the restoration of the guide means to proper operative position after the cause of the interference has been cleared or removed.

The accompanying drawings shown in some detail the deck and stern portion of a trawler having the gear of this invention installed, and having in addition various other improvements mentioned above, such as will be the subjects of companion applications for patent. There are also shown sequential and somewhat diagrammatic views illustrating successive steps in the hauling of a net of the type disclosed in my copending application Serial No. 834,030, filed August 17, 1959, in which curtains replace the usual wings, by means of the gear of this invention.

FIGURES 5 to 10 are somewhat diagrammatic plan views, similar to FIGURE 2, showing successive operations in the hauling of the net.

FIGURE 5 illustrates the hauling of the doors close to the stern of the trawler, and FIGURE 6 shows the first stage of hauling completed, to the extent that the doors are secured to their stanchions, and a lazy line, accessible at this time, has been detached from the door and connected to a hauling line, between proper guides at the stern.

FIGURE 7 illustrates the further step of hauling in the sweep lines and curtains, following winding in of the hauling line, upon special hauling-line drums so as to bring the net body close to the stern of the trawler. The guides constrain the lines and curtains to lay properly onto the drums which reel them in.

FIGURE 8 is a view showing the operation succeeding that of FIGURE 7, wherein snubbers aboard the trawler are connected to the net body to take the strain, whereby the sweep lines and curtains can be slacked off and transferred to a large central drum, as a preliminary to hauling in the after part of the curtain and the net body onto that central drum.

FIGURE 9 shows a step slightly later than that of FIGURE 8, wherein the snubbers have been disconnected from the net, after transferring the sweep lines and curtain lines to the central drum, hauling in, and tensioning the same, and beginning the hauling of the net body aboard the trawler.

FIGURE 10 illustrates nearly the final step, when the forward portion of the net body is hauled aboard and is about to be wound onto the central drum, which eventually will bring the codend on board.

FIGURE 11 illustrates a special condition where numerous fish are caught by their gills in the curtains, obstructing passage of the curtains between laterally slightly spaced paired guide elements, and illustrating how one of the guide elements is thereby automatically or manually displaced to avoid damage to the net or to the gilled fish.

Figure 1:
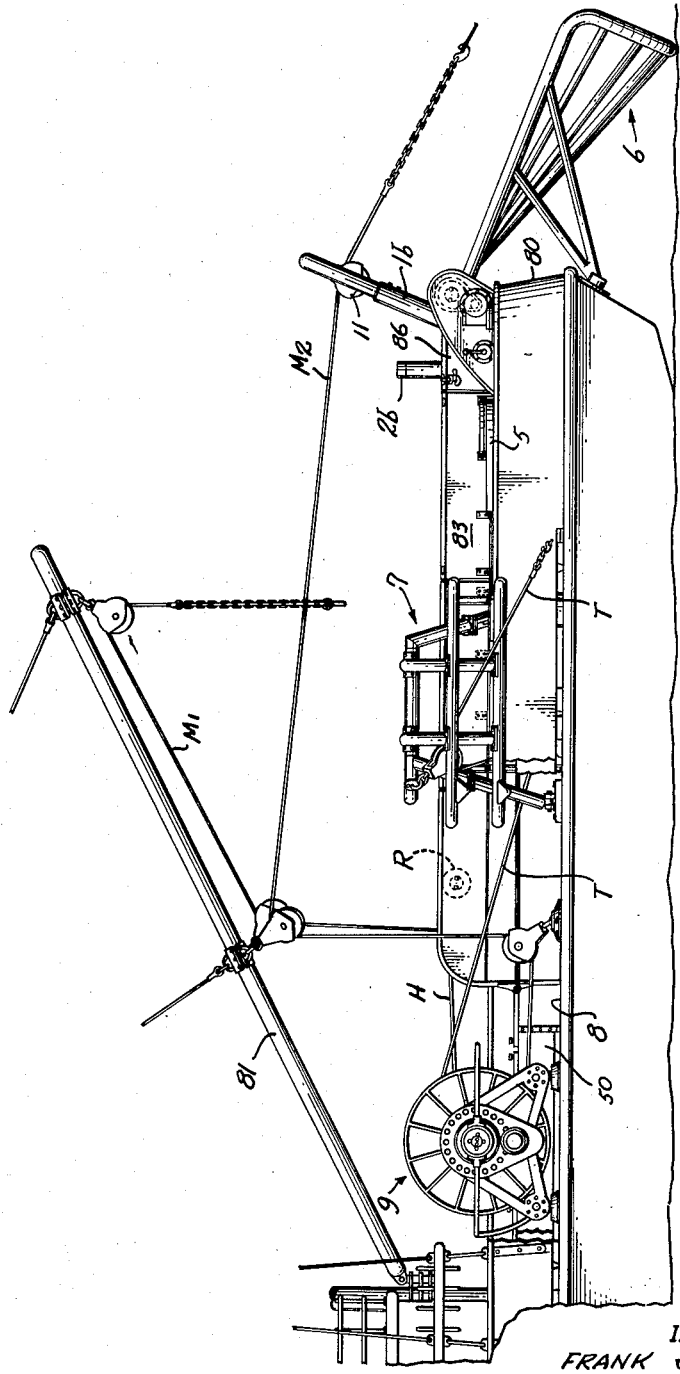
FIGURE 1 is a side elevational view, with part of the near rail broken away, illustrating the stern portion of the trawler.

FIGURE 12 in an enlarged, broken-away side elevation of a detail of a pivot mounting for certain guide posts.

The drawings show the stern portion of a trawler, the trawler being designed and its gear arranged for hauling in over the stern 80. A winch, generally designated by the numeral 9, is arranged on the deck 8 of the trawler, with its axis oriented athwartwise, that is, transversely to the direction of haul. In this particular trawler there is a rather appreciable distance between the winch and the stern, the winch being located indeed more or less amidship, but this location will depend on a number of other factors, for example whether the trawler is intended primarily for shrimp trawling, in which case the winch would be well aft of the location shown herein, and similar factors.

At opposite rails, this being a stern haul trawler, automatic door securing stanchions, the subject of my application Serial No. 861,325, filed December 22, 1959, and generally indicated by the numeral 7, are supported from the deck and side rails for securement and stowage of the doors D which are a part of or accessories to the net itself. For guidance of the codend B of the net, particularly if it is heavily loaded, from the water surface up and onto the deck, a ramp 6 is provided, of suitable construction, such for example as is the subject of my application Serial No. 20,582, filed April 7, 1960. This is in general inclined upwardly from the water surface to the top of the rail at the stern. A boom 81 is normally provided capable of extending aft and carrying certain blocks through which are reeved various lines to assist in the different operations, as will be explained more fully hereinafter. One such line M2 is for dragging a trynet.

Figure 2:
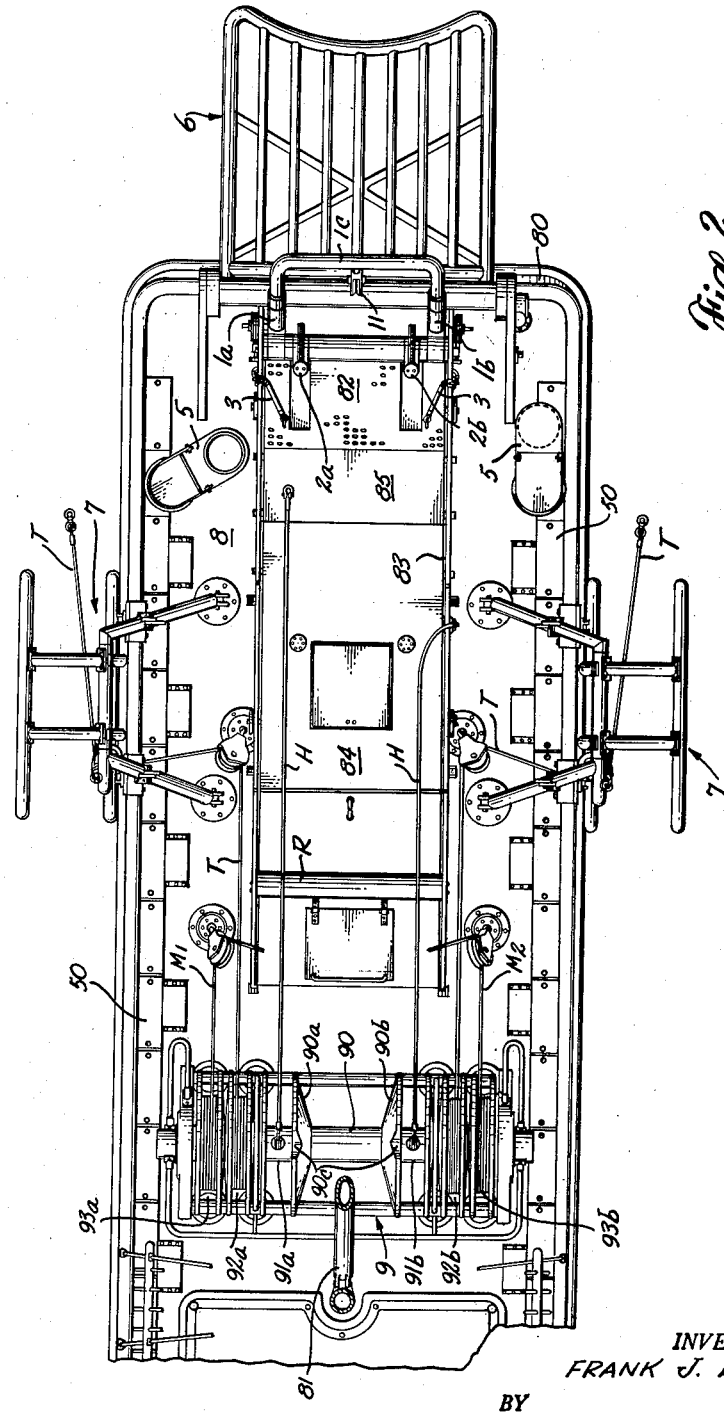
FIGURE 2 is a plan view of the same.

The winch 9 is generally of the type disclosed in my copending application, identified above. It includes at least the deep and wide central drum 90, which is intended for winding on the after part of the curtains and the net body, and the ends of which central drum are defined by the notched flanges 90a and 90b, as in my application Serial No. 836,636 and the smaller drums 91a and 91b alongside and rotatable conjointly with central drum 90. The various other winch drums may be operable conjointly with drum 90, or independently of one another and of the drum 90. Drums 91a, 91b are for reeling in first a pair of hauling lines H, and for hauling in lazy lines L and sweep and curtain lines F and G, which are connected successively during hauling to the hauling lines H and follow in the latter. In addition to these three drums the winch is normally provided with at least two additional drums 92a and 92b, outwardly of the respective drums 91a and 91b, and operable independently of drums 90, 91a and 91b, these additional drums being for the reeling in of the towing warps T, which are connected if the winch is convenient to the doors D. It is convenient if the winch is provided further with drums 93a and 93b (see FIGURE 2, but omitted from the remaining figures), for reeling in lines such as M1, which may be used for general utility purposes, or M2 for handling a small try-net (see FIGURE 1, although the trynet is not shown). These several drums, except usually the conjointly rotatable drums 90, 91a and 91b, are all independently operable, substantially in the manner disclosed in my U.S. Patent No. 2,594,209.

Since it is not practical to use level-wind mechanism to lay the hauling lines and, following them, the sweep lines and curtain lines with curtains attached on the drums 91a and 91b, it is necessary that guides be provided for aligning these lines as they come in over the stern directly onto the drums 91a and 91b. This guidance is afforded by two generally upright posts paired with one another at each side of the stern. Posts 1a and 2a are paired, and posts 1b and 2b are paired. The paired posts are located close to the stern, spaced laterally so as to lead the lines, etc., to the centerline of the respective drums 91a and 91b. It is also desirable that the paired posts be spaced longitudinally as well. The purpose of these spacings will become apparent shortly.

The two posts of each pair are hingedly mounted. The posts 1a and 1b are joined by a bridge 1c, so that they pivot alike, but the posts 2a and 2b are independently pivotable. Either one may hinge forwardly and downwardly to clear the path for a curtain or other net element being reeled on board. This facilitates clearance of bulges in the net and the like, whereas the hinging of the posts 1a and 1b, also forwardly and downwardly, is primarily for stowage when not in use. The ramp 6 is also swingable upwardly, forwardly and then downwardly, so that it too can be stowed, as shown for example in dot-dash lines in FIGURES 3 and 12.

Figure 4:
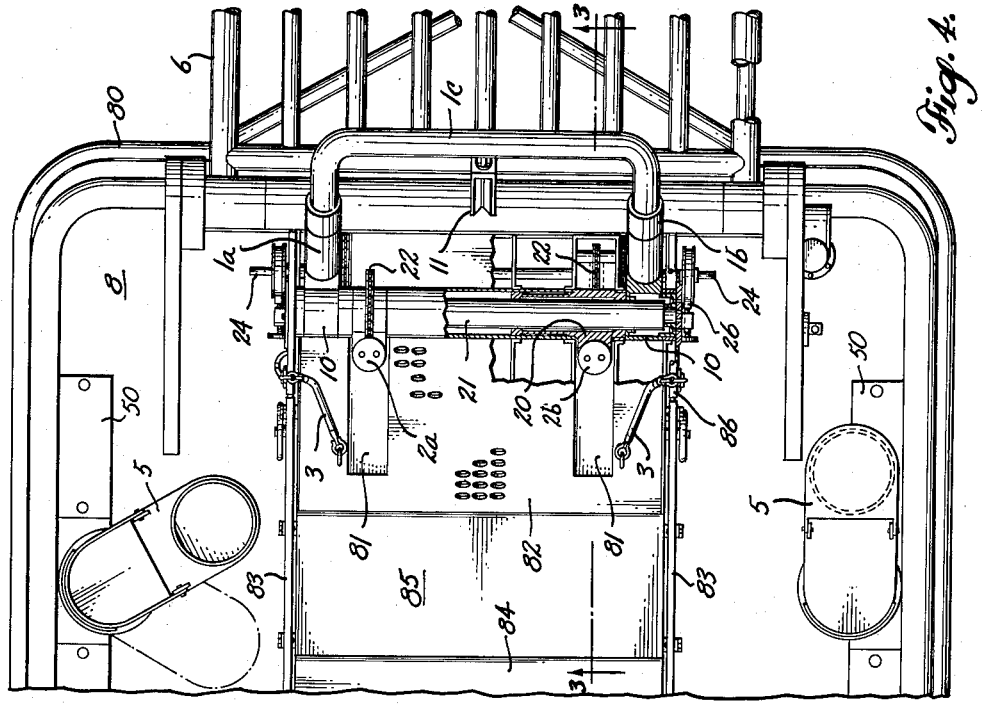
FIGURE 4 is a plan view, partly broken away, showing the same elements, these two figures being drawn to a somewhat larger scale than FIGURES 1 and 2, respectively.
Figure 3:
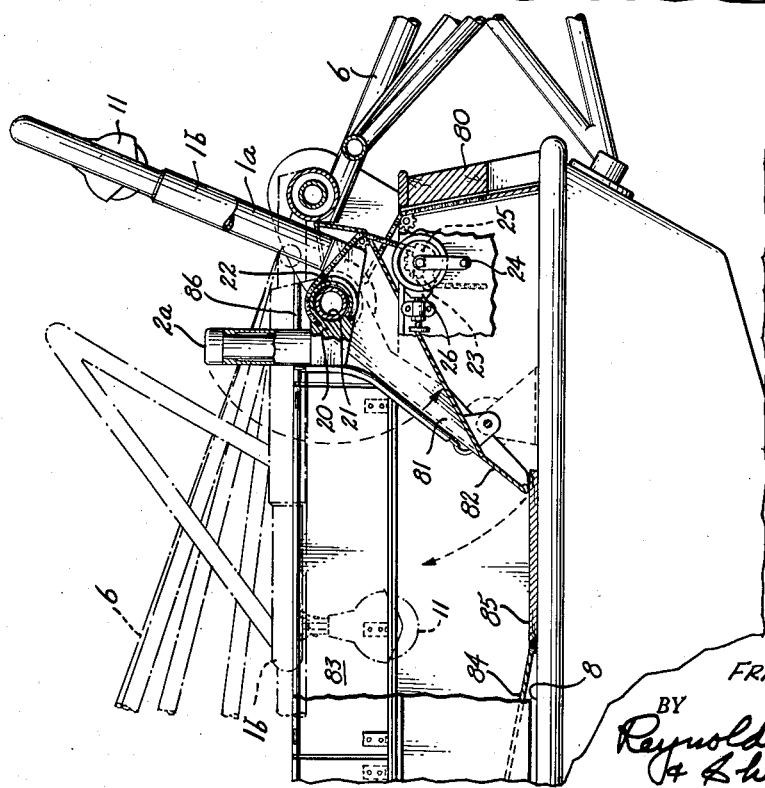
FIGURE 3 is a longitudinal sectional view, substantially at the line 3—3 of FIGURE 4, through certain guide elements.

Reference to FIGURES 3, 4 and 12 will help to make clear the construction and mounting of the posts and the controls for the same. The posts 2a and 2b are each integral with a sleeve 20 (one for each post) which is rotatably mounted on a transverse pivot shaft 21 which is fixed at its ends in the walls 86 rising from the deck, the sleeve 20 affording good bearing on the pivot shaft. Each sleeve 20 has joined to it the chain 22 (see particularly FIGURE 3), which after passing over guide sprocket wheels engages a rotative sprocket wheel 23 turnable by a crank arm 24. The chain is held to the sprocket wheel 23 by a fixed guide or cage 25, so that upon rotation of the crank handle 24 in one sense or the other the sleeve 20 is caused to rotate in the corresponding sense, and the corresponding posts 2a or 2b will rotate upwardly into an upright operative position, or downwardly into a depression 81 in an inclined and usually perforated plate 82 which likewise pivots around the axis of the shaft 21. The plate 82 has no particular function in relation to the mechanism of this invention, but will be described in detail in a companion application. A brake 26 can engage the crank 24 or a pulley rotatable therewith, to retain the post 2a or 2b in its upright position.

The posts 1a and 1b are pivotally mounted by sleeves 10 upon the pivot shaft 21 so that they can rotate between a generally upright postion, but slightly inclined aft, as shown in FIGURES 3 and 12, into horizontal position shown in the same figures in dot-dash lines. Movement of the posts 1a and 1b is accomplished by hand, but means are provided to lock them in either of their limit positions, such means being shown in FIGURE 12. The ends of sleeves 10 have part-circumferential slots 10a through which fixedly positioned clamping bolts 10b, fixed in an upright wall 86 rising from and fast to the deck, pass and are adjustable to retain posts 1a, 1b upright or folded down.

It may help in understanding the operation of this invention if it is explained at this point, that there is a trough having the hinged but normally upstanding side walls 83, formed as forward continuations of fixed walls 86, and a bottom plate 84 sloping aft to a level landing 85, the plate 82 previously referred to sloping oppositely also, and more steeply, toward the landing 85. The fish are released from the codend of the net into this trough on deck, and gravitate toward the landing 85 where they are readily engaged by the fish pews of the crew and segregated into the various kinds of fish to be retained or scrap fish to be tossed overboard. Segregation may be accomplished by directing fish into chutes 5, to pass them onto a conveying and segregating system, not necessary to show nor describe here, but housed in at 50. Neither the trough nor the conveying and segregating devices are part of the present invention, but it helps to understand that the codend is released into the trough between the walls 83, and that the fish are initially segregated and directed in the vicinity of the landing 85.

Refer now to the sequence diagrams, FIGURES 5 to 10, inclusive. FIGURE 5 illustrates the first stage in the hauling of the net. It does not show parts in precisely the same position they would occupy in use because, in order to conserve space, it has been necessary to somewhat compress the net elements laterally, as well as longitudinally, but it shows the doors D being drawn toward the vessel by the towing warps T which are being reeled onto the drums 92a and 92b, whereon they are wound at all times. The lazy lines L extend slackly between the door D and the forward ends of the curtains C of the net. At these forward ends the respective lazy lines are bridled respectively to a buoyed-up curtain line F and a sweep line S. The rig and the net elements, in the preferred arrangement, are in accordance with the net disclosed in my copending application Serial No. 834,030, filed August 17, 1959. The haul lines H are anchored to or wound somewhat upon their respective drums 91a and 91b, but their after ends are secured at the walls 83. Short snubber lines, later referred to, and designated by the numeral 3, are anchored at one end to the trawler as, for example to the plate 82, and at their opposite ends are secured to the walls 86.

Hauling is continued in the manner indicated in FIGURE 5 until the doors D are hauled to and secured to the stanchions 7, as in FIGURE 6; the securement may be effected merely by maintaing the towing warps T taut. Now the forward ends of the lazy lines L are accessible and are disengaged from the door. These lazy lines are long, and their after ends connect usually to the wings of the net. It is important that they be long enough that they can be brought aft and passed within the posts 1a and 1b and outboard of the posts 2a and 2b, all of which are now upstanding. Because the curtain C is still an appreciable distance aft of the doors D, and not alongside, the lazy lines L extend generally aft behind the stern,. There forward ends, which were initially anchored to the doors, are now engaged with the after ends of the hauling lines H, which now are disengaged from the walls 83. Now there is support for the net through the sweep lines G and curtain lines F from the secured door, and two second sets of lines, each consisting of the hauling line H and its connected lazy line L, also extends aft to the net, and is not yet but can be tensioned.

Now the drums 91a and 91b are operated to reel in the hauling lines H and the following lazy lines L, and so by tensioning this second set of lines to pull slack in the first set of lines, specifically in the curtain lines F and sweep lines G. Differing now from FIGURE 6, wherein the wings were still spread somewhat, the effect of the tensioning of the second set of lines H, F, G which are guided between the posts 1a and 1b, is to draw the curtains of the net closely together and tend to close the open throat of the net as it is drawn toward the trawler. The paired posts 1a and 2a, 1b and 2b, guide their respective sweep and curtain lines F and G directly onto the drums 91a and 91b which are intended to receive them, and this is true regardless of whether the vessel tends to slew about with respect to the net and so depart from exact alignment with the net. When the forward ends of the curtains C are accessible, where the curtain line F and sweep line G have disconnectible elements, these lines are disconnected and secured in the walls 86, as is shown in FIGURE 7. The hauling proceeds, and eventually the overhang of the net body, designated O, begins to ride up the ramp. Now eyes E in the sweep lines G are accessible, and the snubbers 3 are brought into operation for the purpose of taking the tension of the net and allowing the sweep and curtain lines F, G to be slacked back, as they are shown slacked in FIGURE 8. The purpose of this is to have the lines F, G slack enough that these lines and the after part of the curtains C that are suspended from one thereof, may be transferred from the drums 91a and 91b, now quite well filled, onto the drum 90. These drums 90 are notched at 90c (see FIGURE 8), and, as is explained in greater detail in my application Serial No. 836,636, one advantage of transferring from the nearly filled drums 91a and 91b to the empty drum 90 is that greater mechanical advantage can be obtained to pull in the most heavily laden portion of the net body, namely, the codend filled with fish, up the incline of the ramp 6 because of the better leverage thus afforded.

Once the transfer has been effected onto the drum 90, as in FIGURE 9, it only remains to haul in the net body. However, since the sweep lines running to the upper and lower bosoms of the net are externally of the posts 2a and 2b, and hence the bosoms cannot pass these posts, these two posts are turned downwardly, as they are shown in FIGURES 9 and 10, and after assuming the tension on the lines F, G running now to the drum 90, the snubbers 3 can be disconnected from the eyes E and parked again, as they are shown in FIGURE 9. The net is now hauled in over the ramp 6 and into the space between the walls 83, the net winding onto the drum 90. The resumption of hauling in is shown in FIGURE 9, and in FIGURE 10 the codend or bag B is shown about to be hauled up the ramp, with the overhang O about to wind onto the drum 90. When the bag B is on deck the cod line P is released and the catch is emptied out the after end of the bag or codend.

When the net is to be reset, the cod line P having been replaced, the codend is drawn aft by use of the trynet line M2 through block 11 and the operations of hauling in are repeated but in reverse succession. The setting is accomplished with a minimum of labor and quickly, and the crew can now apply itself to segregating and disposing of the catch.

It will be evident that if there is any obstruction to the net pulling past the posts 1a and 2a, or the opposite pair, any such obstruction may not be able to pass between the paired posts, notwithstanding that they are spaced apart sufficiently longitudinally to allow a reasonable obstruction to snake its way between them. For instance, there may be gilling of fish in the curtains, as is indicated in FIGURE 11, that is to say, fish instead of avoiding the curtain and entering finally the codend B, try to escape through the curtain and are caught by their gills. A heavy group of gilled fish such as that shown at A in FIGURE 11, may not pass between the posts 1a and 2a, and might tear the net in trying. In such a case, it is normal for the crew member who is at the stern watching the haul, to turn down the post 2a or 2b until the group of gilled fish at A has passed the post. He would then find it difficult, ordinarily, to shift the curtain and the tensioned sweep and curtain lines F, G at this side of the net laterally sufficiently to raise the post 2 again, inboard of the curtain and sweep lines. If this is the case, the vessel is maneuvered into a starboard turn, pulling the lines at the starboard side against the post 1a. Now the post 2a may be lifted. The lines at the port side are not affected by this maneuver for the reason that they are still held between the upraised paired posts 1b and 2b. Either post 2a or 2b can be rotated downwardly out of the way independently of the other such post. Obviously if the posts 2a, 2b were to be connected to swing downwardly together (when the above gilled condition presented itself) rather than independently, it would be virtually impossible to guide both hauling lines correctly; one would always remain unguided, and the hauling operation would be most difficult.

Now with the gilled fish F removed the hauling continues as before, and there may be several groups of gilled fish which may have to be disengaged in the same way.

There is a roller R supported between opposite trough walls and elevated above the bottom of the trough near its forward end, over which all lines such as H, L, F and G, and the curtain C, run. The forward part of the codend B, when the net body is hauled fully aboard, also extends over the roller R. Its purpose is to elevate the codend as much as possible in its forward portion, so that when the cod line P is released the catch will spill aft from within the net, towards the landing 85 at the deepest part of the trough, where stand the crew members who segregate the fish. Otherwise the codend would not clear readily.

I claim as my invention:

1. Trawling gear for hauling in first the opposite mesh elements at the sides of a trawl net and then the net body itself which joins such side elements, which gear comprises a wide central drum for reeling on the net body and coaxial narrow drums at the respective ends of the central drum for reeling on the side elements, said drums being installed aboard a trawler with their axis athwartwise, two pairs of posts upstanding in use at the stern, each pair in line with the respective end flanges of the corresponding narrow drum, and means mounting the inboard post of each pair for movement downwardly, out of the path of the net body itself or other obstruction.

2. Trawling gear for hauling a trawl net by lines extending forwardly from oppositely divergent mesh elements which themselves extend forwardly at opposite sides of the net body, comprising a winch installed on a trawler with its axis transverse to the direction of haul, and having a wide central drum for reception of the net body and two narrow drums at the opposite ends of the central drum, a pair of elongated guides installed upright at the rail for each narrow drum and in line with the respective end flanges of the corresponding narrow drum, said guides guiding the lines and the opposite mesh elements of the net at the respective sides between them and directly onto the narrow drums, the inboard guides of the respective pairs being removably mounted, to clear the path of the net body onto the central drum.

3. Trawling gear as in claim 2, wherein the guides of each pair are spaced longitudinally, for passage of excess bulk between them.

4. Trawling gear for towing and hauling a trawl net such as has a net body including a codend, divergent curtains extending ahead thereof, doors ahead of said curtains, and towing warps extending from each door to the trawler, said trawling gear including a winch mounted upon the trawler's deck with its axis transverse to the direction in which the net is hauled, said winch having a central drum of a length and depth to wind on the net body, two adjoining coaxial hauling line drums located for independent rotation at the opposite ends of said central drum, and two towing warp drums located for independent rotation respectively outwardly of the ends of the hauling line drums, two towing warps extending from the respective towing warp drums aft, during trawling, to the respective doors, two hauling lines which, during hauling, extend at right angles to the winch's axis, and to the curtains, upstanding guides aligned with the outer ends of each hauling line drum, to guide the hauling line and the connected curtains directly onto the hauling line drums, snubber means carried by the trawler at the opposite sides of the net's path during hauling, and engageable with the net after it has been hauled to the trawler to take the strain thereof while the hauling lines are slacked back, and the connected curtains, just ahead of the net, are lead from the hauling line drums over the inner flanges thereof onto the adjoining central drum, for winding the net body onto the latter upon again winding in the central drum and the hauling line drums.

5. In combination with a trawler for towing a trawler net therebehind, means for hauling the net over the stern of the trawler comprising winch means mounted on the deck of the trawler for rotation about an axis extending transverse the longitudinal axis of the trawler and including a net winding drum and a haul line drum adjacent each end of the net winding drum, a pair of posts on each side of the trawler for guiding haul lines extending from the haul line drums, and means mounting each pair of posts in upright disposition during the hauling operation rearward of the winch means and in generally spaced alignment with the end portions of one of the haul line drums, the inboard post of each pair being mounted for independent pivotal movement toward the trawler deck and out of the path of the net.

6. The combination according to claim 5 wherein each pair of posts is correspondingly spaced with the other rearward of the winch means.

7. The combination according to claim 5 wherein the inboard post in each pair is mounted in closer spaced relation to its respective haul line drum than the respective outboard post in said pair.

8. The combination according to claim 5 wherein the winch means is mounted athwart the trawler deck forward of the trawler stern and the respective pairs of posts are mounted adjacent opposite sides of the stern.

9. The combination according to claim 5 wherein the outboard post and the inboard post in each pair is mounted for pivotal movement about its lower end toward the trawler deck.

10. The combination according to claim 9 further comprising a cross bar joining the upper ends of the outboard posts.

11. The combination according to claim 5 further comprising means forming a ramp at the trawler stern inclined operatively downwardly from the deck thereof in the path of the net.

12. The combination according to claim 5 further comprising stanchion members on opposite sides of the trawler to secure the net doors during the hauling operation.

13. The combination according to claim 12 wherein the winch means also includes a pair of additional drums for winding towing warps extending from the net doors, said additional drums being mounted to port and starboard of the hauling line drums.

References Cited in the file of this patent

UNITED STATES PATENTS

| | | |
|---|---|---|
| 1,601,893 | Vigneron | Oct. 5, 1926 |
| 1,727,071 | Lovell | Sept. 3, 1929 |
| 1,863,989 | Liisanantti | June 21, 1932 |
| 2,579,787 | Burney | Dec. 25, 1951 |
| 2,592,331 | Ray | Apr. 8, 1952 |
| 2,634,096 | Hopkinson | Apr. 7, 1953 |
| 2,733,530 | Puretic | Feb. 7, 1956 |
| 2,814,145 | Fredericks | Nov. 26, 1957 |
| 2,898,695 | Behring | Aug. 11, 1959 |
| 2,925,680 | Puretic | Feb. 23, 1960 |
| 2,954,209 | Luketa | Sept. 27, 1960 |

FOREIGN PATENTS

| | | |
|---|---|---|
| 1,158,701 | France | Jan. 27, 1958 |